US010673276B2

(12) United States Patent
Tokura et al.

(10) Patent No.: US 10,673,276 B2
(45) Date of Patent: Jun. 2, 2020

(54) COIL DEVICE, WIRELESS POWER TRANSFER SYSTEM, AND AUXILIARY MAGNETIC MEMBER

(71) Applicant: IHI CORPORATION, Tokyo (JP)

(72) Inventors: Susumu Tokura, Tokyo (JP); Masakazu Hara, Tokyo (JP); Kentarou Furiya, Tokyo (JP); Jun Araki, Tokyo (JP)

(73) Assignee: IHI Corporation, Tokyo (JP)

( * ) Notice: Subject to any disclaimer, the term of this patent is extended or adjusted under 35 U.S.C. 154(b) by 19 days.

(21) Appl. No.: 15/584,326

(22) Filed: May 2, 2017

(65) Prior Publication Data

US 2017/0237291 A1 Aug. 17, 2017

Related U.S. Application Data

(63) Continuation of application No. PCT/JP2015/080602, filed on Oct. 29, 2015.

(30) Foreign Application Priority Data

Nov. 7, 2014 (JP) ................................. 2014-226738

(51) Int. Cl.
| | |
|---|---|
| *H01F 27/36* | (2006.01) |
| *H02J 50/10* | (2016.01) |
| *B60L 5/00* | (2006.01) |
| *H01F 38/14* | (2006.01) |
| *H01F 27/38* | (2006.01) |
| *H01F 3/14* | (2006.01) |
| *B60L 50/50* | (2019.01) |
| *H02J 7/00* | (2006.01) |

(Continued)

(52) U.S. Cl.
CPC ............... *H02J 50/10* (2016.02); *B60L 5/00* (2013.01); *B60L 50/50* (2019.02); *H01F 3/14* (2013.01); *H01F 27/38* (2013.01); *H01F 37/00* (2013.01); *H01F 38/14* (2013.01); *H02J 7/00* (2013.01); *B60M 7/00* (2013.01)

(58) Field of Classification Search
CPC .................................... H02J 7/00; H02J 50/10
USPC .......................................................... 320/108
See application file for complete search history.

(56) References Cited

U.S. PATENT DOCUMENTS

2008/0129246 A1 6/2008 Morita et al.
2010/0225271 A1* 9/2010 Oyobe .................... B60L 53/12
320/108

(Continued)

FOREIGN PATENT DOCUMENTS

| JP | 2006-054958 A | 2/2006 |
| JP | 2008-120239 A | 5/2008 |

(Continued)

*Primary Examiner* — Richard Isla
*Assistant Examiner* — Johali A Torres Ruiz
(74) *Attorney, Agent, or Firm* — Volpe and Koenig, P.C.

(57) ABSTRACT

Provided is a first coil device that faces a second coil device in a facing direction, and wirelessly transmits or receives power, the first coil device including a first coil portion, and a first auxiliary magnetic member provided adjacent to the first coil portion in a first direction orthogonal to the facing direction. The first auxiliary magnetic member is configured to be closer to the second coil device with increasing distance in the first direction from the first coil portion.

19 Claims, 9 Drawing Sheets

(51) Int. Cl.
  *H01F 37/00*  (2006.01)
  *B60M 7/00*  (2006.01)

(56) References Cited

U.S. PATENT DOCUMENTS

| | | | |
|---|---|---|---|
| 2011/0148351 A1* | 6/2011 | Ichikawa | H01F 27/26 |
| | | | 320/108 |
| 2013/0082539 A1* | 4/2013 | Tengner | B60L 11/182 |
| | | | 307/104 |
| 2013/0320759 A1 | 12/2013 | Abe et al. | |
| 2014/0176059 A1 | 6/2014 | Lee et al. | |
| 2014/0306654 A1* | 10/2014 | Partovi | H02J 7/025 |
| | | | 320/108 |
| 2015/0170814 A1* | 6/2015 | Blum | B60L 11/182 |
| | | | 307/9.1 |
| 2015/0332847 A1 | 11/2015 | Omori et al. | |
| 2015/0380157 A1* | 12/2015 | Green | H01F 27/365 |
| | | | 307/104 |
| 2016/0005532 A1 | 1/2016 | Terayama et al. | |
| 2016/0031331 A1* | 2/2016 | Altunyurt | B60L 58/12 |
| | | | 320/108 |
| 2016/0144727 A1* | 5/2016 | Tokura | H01F 38/14 |
| | | | 307/104 |

FOREIGN PATENT DOCUMENTS

| | | |
|---|---|---|
| JP | 2010-172084 A | 8/2010 |
| JP | 2011-193616 A | 9/2011 |
| JP | 2012-175793 A | 9/2012 |
| JP | 2014-053366 A | 3/2014 |
| JP | 2014-099524 A | 5/2014 |
| JP | 2014-179438 A | 9/2014 |
| TW | 200832860 A | 8/2008 |
| WO | 2014/076953 A1 | 5/2014 |
| WO | 2014/119297 A1 | 8/2014 |

* cited by examiner

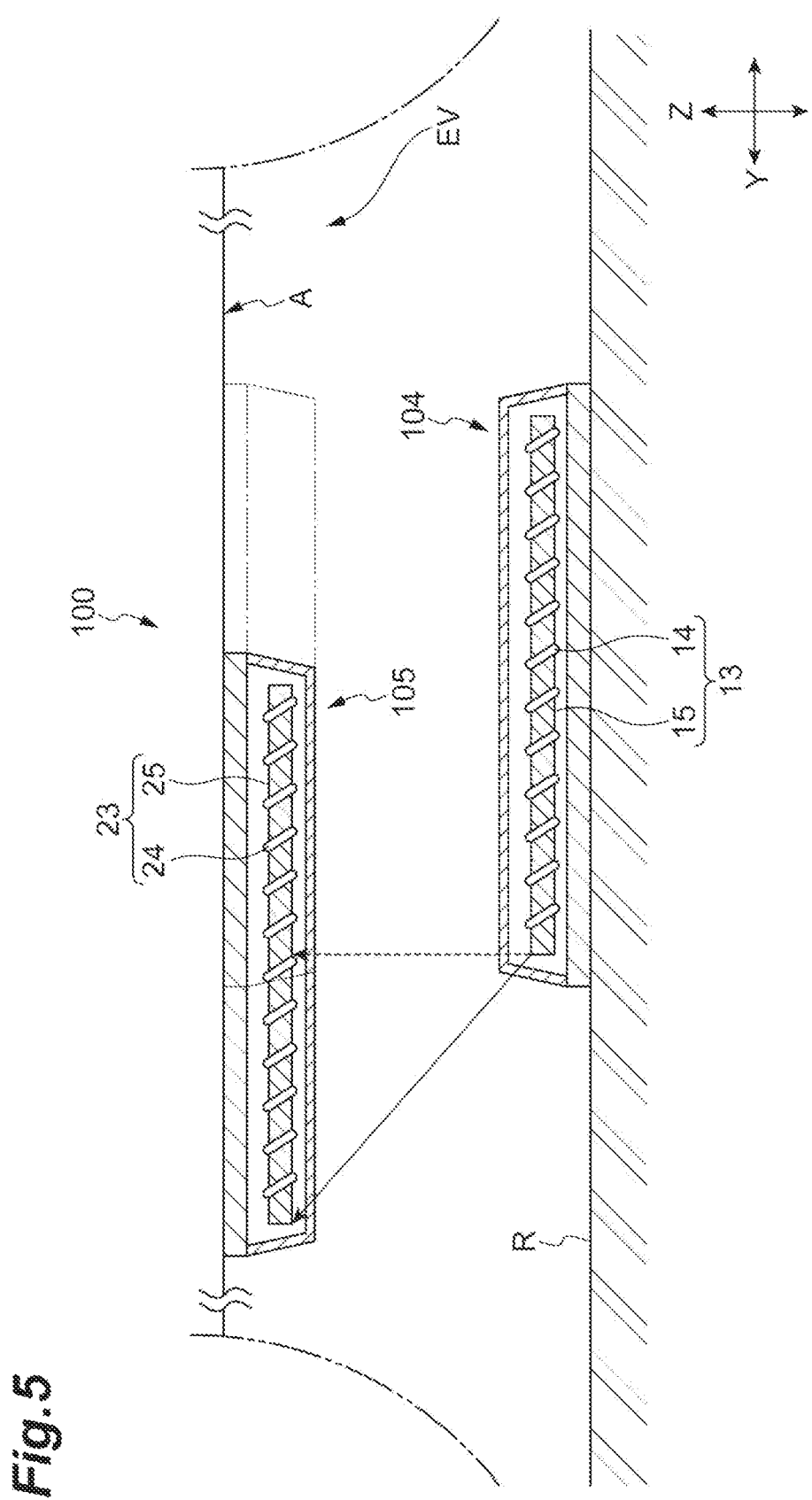

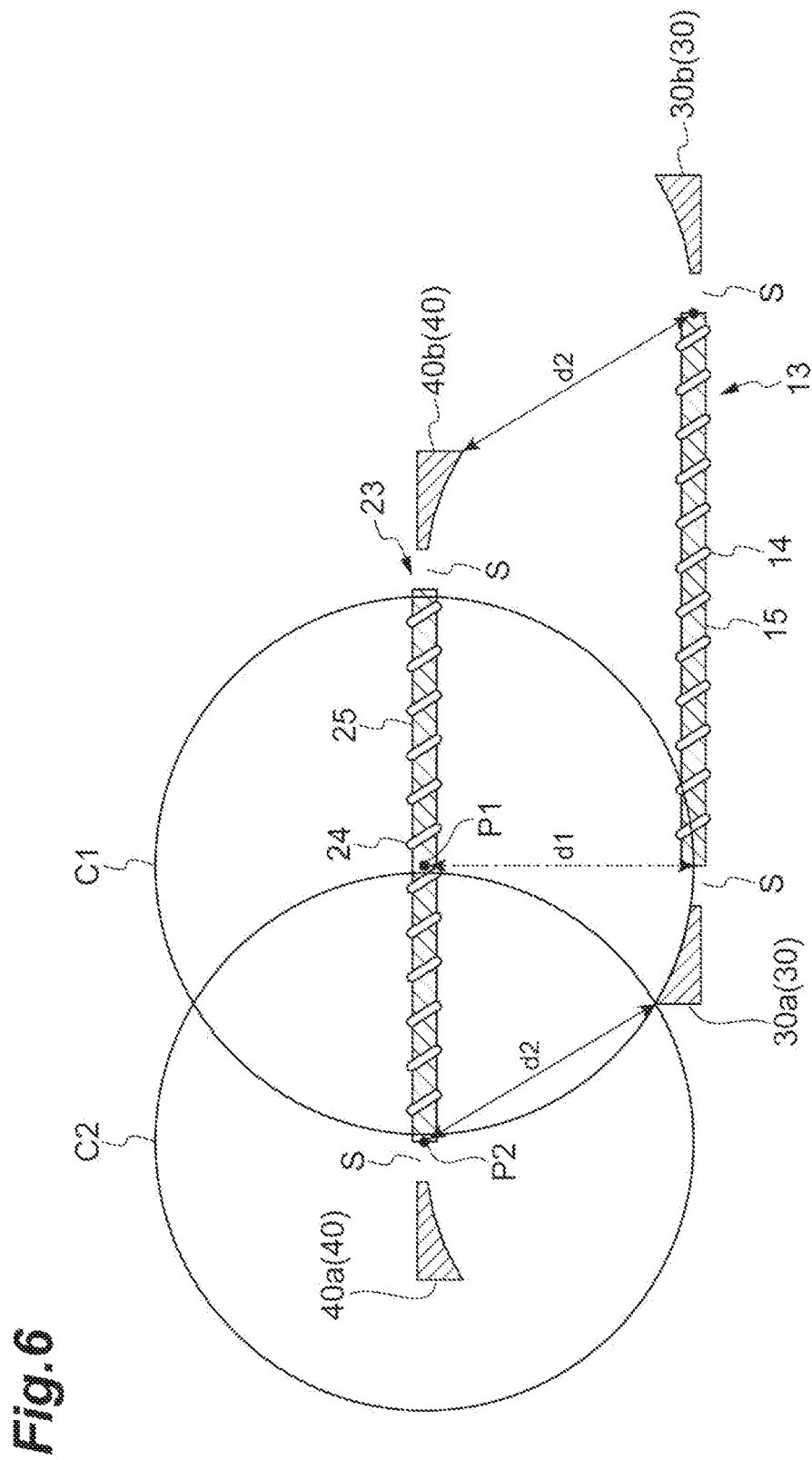

COIL DEVICE, WIRELESS POWER TRANSFER SYSTEM, AND AUXILIARY MAGNETIC MEMBER

CROSS-REFERENCE TO RELATED APPLICATIONS

This application is a continuation application of International Application No. PCT/JP2015/080602, filed on Oct. 29, 2015, which claims priority to Japanese Patent Application No. 2014-226738, filed on Nov. 7, 2014. The contents of these applications are incorporated herein by reference in their entirety.

TECHNICAL FIELD

The present disclosure relates to a coil device, a wireless power transfer system, and an auxiliary magnetic member.

BACKGROUND ART

A wireless power transfer system includes a power transmission coil device and a power reception coil device, and implements wireless power transmission using electromagnetic induction, magnetic resonance or the like between coils. For example, the wireless power transfer system is applied to a power feeding system for an electric vehicle or a plug-in hybrid vehicle. In this case, the power reception coil device is installed in a vehicle.

Meanwhile, the power transmission coil device is installed in a parking space or the like. For example, as illustrated in Patent Document 1, the power transmission coil device includes a core. The core described in Patent Document 1 includes a winding core portion around which an electric wire is wound, and a protrusion disposed to be separated from the winding core portion in a winding axis direction of a coil. Both the winding core portion and the protrusion are made of a magnetic material, and a part therebetween is to a discontinuous portion, that is, a space in which the core is not present. The protrusion described in Patent Document 1 is provided to reduce a leakage magnetic field in the winding axis direction.

CITATION LIST

Patent Literature

Patent Document 1: International Publication WO 2014/076953

SUMMARY

Technical Problem

The protrusion described in Patent Document 1 extends perpendicular to the winding axis direction. In other words, the protrusion protrudes in a direction of approaching the power reception coil device, that is, upward. In this way, the protrusion forms a magnetic path directed vertically upward. For this reason, when a power transmission coil and a power reception coil directly face each other without a misalignment, a magnetic flux directed vertically upward is easily interlinked with the power reception coil.

However, when the power transmission coil and the power reception coil are misaligned, an end portion of the power reception coil is not positioned directly above an end portion of the power transmission coil, and thus a distance between the end portion of the power transmission coil and the end portion of the power reception coil increases. Then, there is a possibility that a magnetic flux from the power transmission coil may return to the power transmission coil rather than the power reception coil. In more detail, the magnetic flux from the power transmission coil passes through a route from a positive pole of a ferrite of the power transmission coil to a negative pole of the ferrite of the power transmission coil rather than a route of a positive pole of the ferrite of the power transmission coil, a negative pole of a ferrite of the power reception coil, a positive pole of the ferrite of the power reception coil, and then a negative pole of the ferrite of the power transmission coil. As a result, the number of magnetic fluxes interlinked in the power transmission coil increases, and thus the magnetic flux from the power transmission coil is rarely interlinked with the power reception coil. For this reason, coupling between the power transmission coil and the power reception coil is weakened, and power efficiency decreases at the time of the misalignment. As described above, even though Patent Document 1 examines prevention of a magnetic flux leakage, Patent Document 1 fails to examine an efficiency reduction at the time of the misalignment.

The disclosure describes a coil device, a wireless power transfer system, and an auxiliary magnetic member capable of suppressing a reduction in power efficiency even when a misalignment occurs between a pair of coil devices.

Solution to Problem

An aspect of the disclosure is a first coil device that faces a second coil device in a facing direction, and wirelessly transmits or receives power, the first coil device including a first coil portion, and a first auxiliary magnetic member provided adjacent to the first coil portion in a first direction orthogonal to the facing direction, wherein the first auxiliary magnetic member is configured to be closer to the second coil device with increasing distance in the first direction from the first coil portion.

Another aspect of the disclosure is an auxiliary magnetic member provided, among a first coil device and a second coil device, at least in the first coil device for performing wireless power transfer, the auxiliary magnetic member being provided adjacent to a coil portion of the first coil device in a first direction orthogonal to a facing direction in which the first coil device faces the second coil device, and configured to be closer to the second coil device with increasing distance in the first direction from the coil portion.

Effects

Some aspects of the disclosure make it possible to suppress a reduction in power efficiency even when a misalignment occurs between a pair of coil devices.

BRIEF DESCRIPTION OF DRAWINGS

FIG. 5 is a side cross-sectional view illustrating a state in which a misalignment occurs in a conventional wireless power transfer system.

FIG. 6 is a side cross-sectional view schematically illustrating a main part of a wireless power transfer system according to a second embodiment of the disclosure.

DESCRIPTION OF EMBODIMENTS

Figure 1:
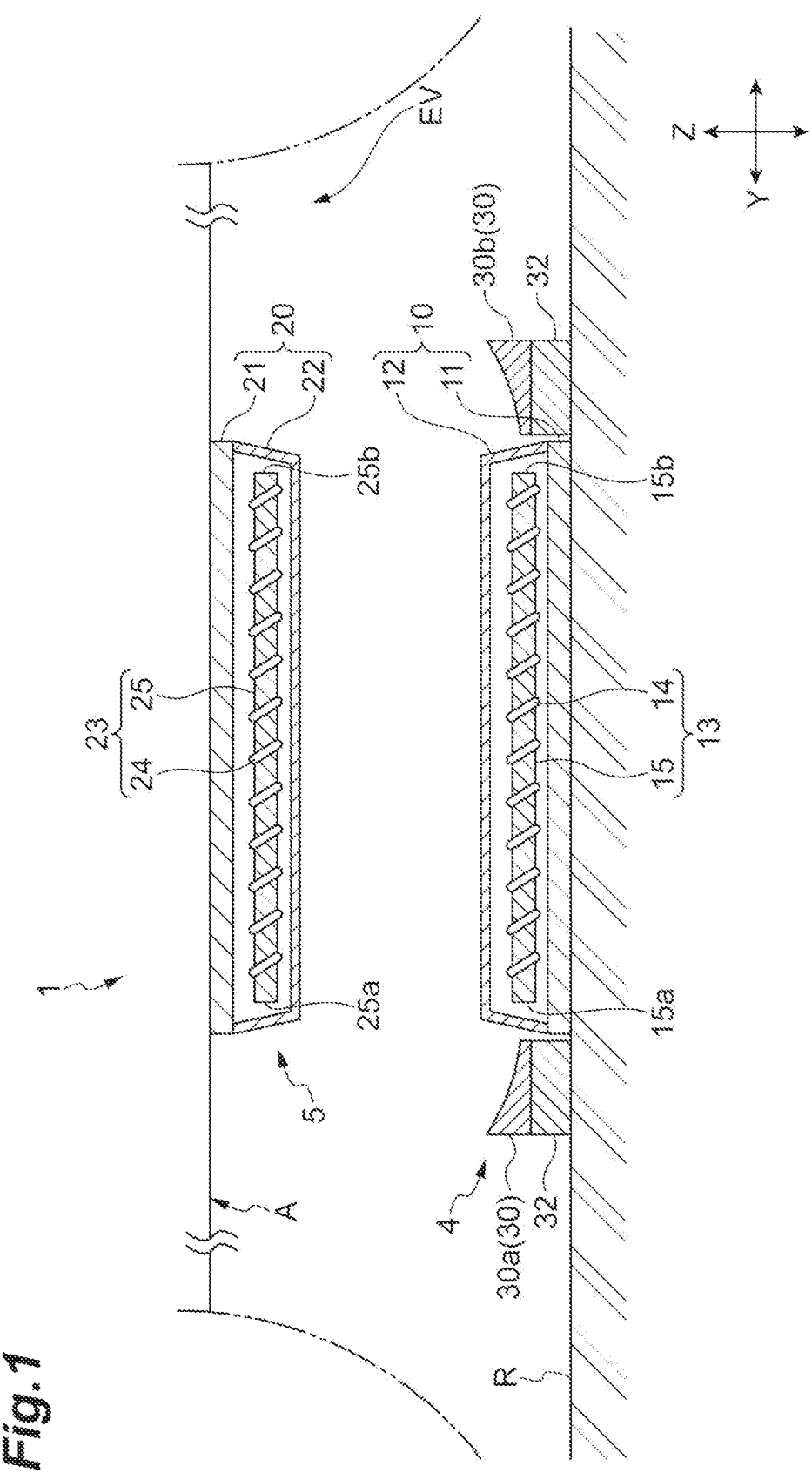
FIG. 1 is a side cross-sectional view schematically illustrating a wireless power transfer system according to a first embodiment of the disclosure.

An aspect of the disclosure is a first coil device that faces a second coil device in a facing direction, and wirelessly transmits or receives power, the first coil device including a first coil portion, and a first auxiliary magnetic member provided adjacent to the first coil portion in a first direction orthogonal to the facing direction, wherein the first auxiliary magnetic member is configured to be closer to the second coil device with increasing distance in the first direction from the first coil portion.

The first coil device wirelessly transmits or receives power by facing the second coil device. The first auxiliary magnetic member is provided adjacent to the first coil portion. When a misalignment occurs in the first direction between a pair of coil devices, the first coil portion does not directly face a second coil portion of the second coil device. In this case, a distal end portion of the second coil portion is closer to the first auxiliary magnetic member than to the first coil portion. Therefore, when a magnetic flux is not directly directed to the second coil portion from the first coil portion, and the magnetic flux is directed to the second coil portion via the first auxiliary magnetic member, a length of the magnetic flux passing through air may be inhibited from increasing. Further, the first auxiliary magnetic member is configured to be closer to the second coil device with increasing distance in the first direction from the first coil portion. Thus, even when the misalignment increases, the first auxiliary magnetic member becomes closer to the second coil device by the increase. As such, even when the misalignment is large, the length of the magnetic flux passing through air may be inhibited from increasing. In this way, a variation in distance between the coil portions may be suppressed irrespective of the misalignment amount. As a result, a reduction in power efficiency may be suppressed.

In some aspects, a space is provided between the first auxiliary magnetic member and the first coil portion. In this case, when no misalignment occurs in the first direction between the pair of coil devices, a magnetic flux is easily directly directed to the second coil portion from the first coil portion by providing the space.

In some aspects, the first auxiliary magnetic member includes a plurality of divided magnetic members arranged side by side in the first direction. In this case, the magnetic flux is easily directed to the second coil portion from a divided magnetic member closest to the distal end portion of the second coil portion depending on the size of the misalignment.

In some aspects, a gap is provided between the plurality of divided magnetic members. In this case, the magnetic flux may be more reliably directed to the second coil portion from the divided magnetic member closest to the distal end portion of the second coil portion by providing the gap.

In some aspects, a facing surface of the first auxiliary magnetic member facing the second coil device extends along a circumference of a circle, a center of which is at an end portion of the second coil portion, passing through an end portion of the first coil portion when a position of the end portion of the first coil portion is matched with a position of the end portion of the second coil portion in the first direction. In this case, a shortest path obtained when no misalignment occurs (that is, a path corresponding to a radius of the circle) may be implemented even when a misalignment occurs in the first direction between the pair of coil devices. In this way, a reduction in power efficiency at the time of the misalignment is suppressed at a minimum.

In some aspects, the first auxiliary magnetic member is provided adjacent to the first coil portion in a second direction orthogonal to each of the facing direction and the first direction. In this case, an effect that a reduction in power efficiency is suppressed is exhibited with respect to both the misalignment in the first direction and the misalignment in the second direction.

In some aspects, the first auxiliary magnetic member is configured such that a slope of the facing surface thereof facing the second coil device is adjustable. In this case, the slope of the facing surface of the first auxiliary magnetic member may be adjusted as to a variation of a gap between the first coil portion and the second coil portion. Therefore, an effect that a reduction in power efficiency is suppressed is exhibited with respect to a position variation in the facing direction.

In some aspects, a wireless power transfer system includes the first coil device described above, and the second coil device that faces the first coil device to wirelessly transmits or receives power to and from the first coil device, wherein the second coil device includes a second coil portion, and a second auxiliary magnetic member provided adjacent to the second coil portion in the first direction, and the second auxiliary magnetic member is configured to be closer to the first coil device with increasing distance in the first direction from the second coil portion. According to this wireless power transfer system, even when a misalignment occurs between the first coil device and the second coil device, a reduction in power efficiency may be suppressed in two types of magnetic paths.

Another aspect of the disclosure is an auxiliary magnetic member provided, among a first coil device and a second coil device, at least in the first coil device for performing wireless power transfer, the auxiliary magnetic member being provided adjacent to a coil portion of the first coil device in a first direction orthogonal to a facing direction in which the first coil device faces the second coil device, and configured to be closer to the second coil device with increasing distance in the first direction from the coil portion.

According to this auxiliary magnetic member, when a misalignment occurs in the first direction between a pair of coil devices, the coil portion of the first coil device does not directly face a coil portion of the second coil device. In this case, a distal end portion of the coil portion the second coil device is closer to the auxiliary magnetic member than to the coil portion of the first coil device. Therefore, when a magnetic flux is not directly directed to the coil portion of the second coil device from the coil portion of the first coil device, and the magnetic flux is directed to the coil portion of the second coil device via the auxiliary magnetic member, a length of the magnetic flux passing through air may be inhibited from increasing. Further, the auxiliary magnetic member is configured to be closer to the second coil device with increasing distance in the first direction from the coil portion of the first coil device. Thus, even when the misalignment increases, the auxiliary magnetic member becomes closer to the second coil device by the increase. As such, even when the misalignment is large, the length of the magnetic flux passing through air may be inhibited from increasing. In this way, a variation in distance between the coil portions may be suppressed irrespective of the misalignment amount. As a result, a reduction in power efficiency may be suppressed.

Hereinafter, embodiments of the disclosure will be described with reference to drawings. In description of the drawings, the same reference numeral will be assigned to the same element, and a repeated description will be omitted. In addition, the respective drawings are prepared for description, and illustrated to particularly emphasize a part to be described. For this reason, a ratio of dimensions of respective members in the drawings may not be the same as an actual ratio. In description below, a left-right direction X, a front-rear direction Y, and vertical direction Z refer to directions based on an electric vehicle EV.

A description will be given of a wireless power transfer system 1 of the present embodiment, and a power transmission coil device 4 and a power reception coil device 5 applied thereto. The wireless power transfer system 1 includes the power transmission coil device (one coil device, a first coil device) 4 and the power reception coil device (the other coil device, a second coil device) 5, and is a system for wirelessly supplying power from the power transmission coil device 4 to the power reception coil device 5 (that is, for performing wireless power transfer). The power transmission coil device 4 and the power reception coil device 5 are separated from each other in the vertical direction Z (facing direction). For example, the power transmission coil device 4 is installed on a road surface R of a parking lot or the like. For example, the power reception coil device 5 is mounted in the electric vehicle (movable body) EV. The wireless power transfer system 1 is configured to supply power to the electric vehicle EV arriving at the parking lot or the like using magnetic coupling between coils of a magnetic resonance scheme, an electromagnetic induction scheme or the like.

The power transmission coil device 4 is provided to protrude upward from the road surface R. For example, the power transmission coil device 4 has a shape of a flat frustum or a rectangular parallelepiped. A controller, an inverter or the like (not illustrated) is connected to the power transmission coil device 4. Desired AC power generated by a DC power source or an AC power source is sent to the power transmission coil device 4. When the AC power is sent to the power transmission coil device 4, the power transmission coil device 4 generates a magnetic flux. The power transmission coil device 4 (including an auxiliary ferrite 30 described below) may be buried in the road surface R rather than protruding from the road surface R.

The power transmission coil device 4 includes a flat plate-shaped power transmission coil portion (first coil portion) 13 that generates a magnetic flux, and a housing 10 that accommodates the power transmission coil portion 13. For example, the housing 10, which is flat, includes a base 11 fixed to the road surface R and a protective cover 12 fixed to the base 11 to form an accommodation space between the protective cover 12 and the base 11. For example, the base 11 and the protective cover 12 are made of resin. Alternatively, the base 11 not facing the power reception coil device 5 may be embodied using a nonmagnetic and conductive material (for example, aluminum).

The power transmission coil portion 13 includes a ferrite plate 15 which is a rectangular plate-shaped magnetic member, and a conductive wire 14 wound around the ferrite plate 15. The conductive wire 14 which is a litz wire is spirally wound around the ferrite plate 15. The conductive wire 14 may be directly wound around the ferrite plate 15, or wound around bobbins (winding plates) disposed on both surfaces of the ferrite plate 15. The power transmission coil portion 13 is a solenoid coil. In the present embodiment, the power transmission coil portion 13 is disposed such that a winding axis direction (left-right direction in the figure) is parallel to the front-rear direction Y, and a wound wire direction (direction vertical to paper) is parallel to the left-right direction X.

The power reception coil device 5 is attached to a bottom surface of a vehicle body (an iron chassis A or the like) of the electric vehicle EV, and faces the power transmission coil device 4 in the vertical direction (facing direction) Z. For example, the power reception coil device 5 has a shape of a flat frustum or a rectangular parallelepiped. A controller, a rectifier or the like (not illustrated) is connected to the power reception coil device 5. The power reception coil device 5 generates an induced current when a magnetic flux F (see FIG. 4) generated in the power transmission coil device 4 is interlinked with the power reception coil device 5. In this way, the power reception coil device 5 wirelessly receives power from the power transmission coil device 4. The power received by the power reception coil device 5 is supplied to a load (for example, a battery).

The power reception coil device 5 includes a flat plate-shaped power reception coil portion 23 (second coil portion) that generates an induced current, and a housing 20 that accommodates the power reception coil portion 23. For example, the housing 20, which is flat, includes a base 21 fixed to the vehicle body of the electric vehicle EV and a protective cover 22 fixed to the base 21 to form an accommodation space between the protective cover 22 and the base 21. For example, the base 21 and the protective cover 22 are made of resin. Alternatively, the base 21 not facing the power transmission coil device 4 may be embodied using a nonmagnetic and conductive material (for example, aluminum).

The power reception coil portion 23 includes a ferrite plate 25 which is a rectangular plate-shaped magnetic member, and a conductive wire 24 wound around the ferrite plate 25. The conductive wire 24 which is a litz wire is spirally wound around the ferrite plate 25. The conductive wire 24 may be directly wound around the ferrite plate 25, or wound around bobbins (winding plates) disposed on both surfaces of the ferrite plate 25. The power reception coil portion 23 is a solenoid coil. In the present embodiment, the power reception coil portion 23 is disposed such that a winding axis direction (left-right direction in the figure) is parallel to the front-rear direction Y, and a wound wire direction (direction vertical to paper) is parallel to the left-right direction X.

In the wireless power transfer system 1, a shape and a size of the power transmission coil portion 13 are equal to a shape and a size of the power reception coil portion 23. A common coil device may be used as the power transmission coil device 4 and the power reception coil device 5. When a center of the power reception coil device 5 in the front-rear direction Y is conformed to a center of the power transmission coil device 4 in the front-rear direction Y, positions of both end portions of the power transmission coil portion 13, that is, a front end portion 15a and a rear end portion 15b of the ferrite plate 15 in the front-rear direction Y are identical to positions of a front end portion 25a and a rear end portion 25b of the ferrite plate 25 in the front-rear direction Y.

Figure 2:
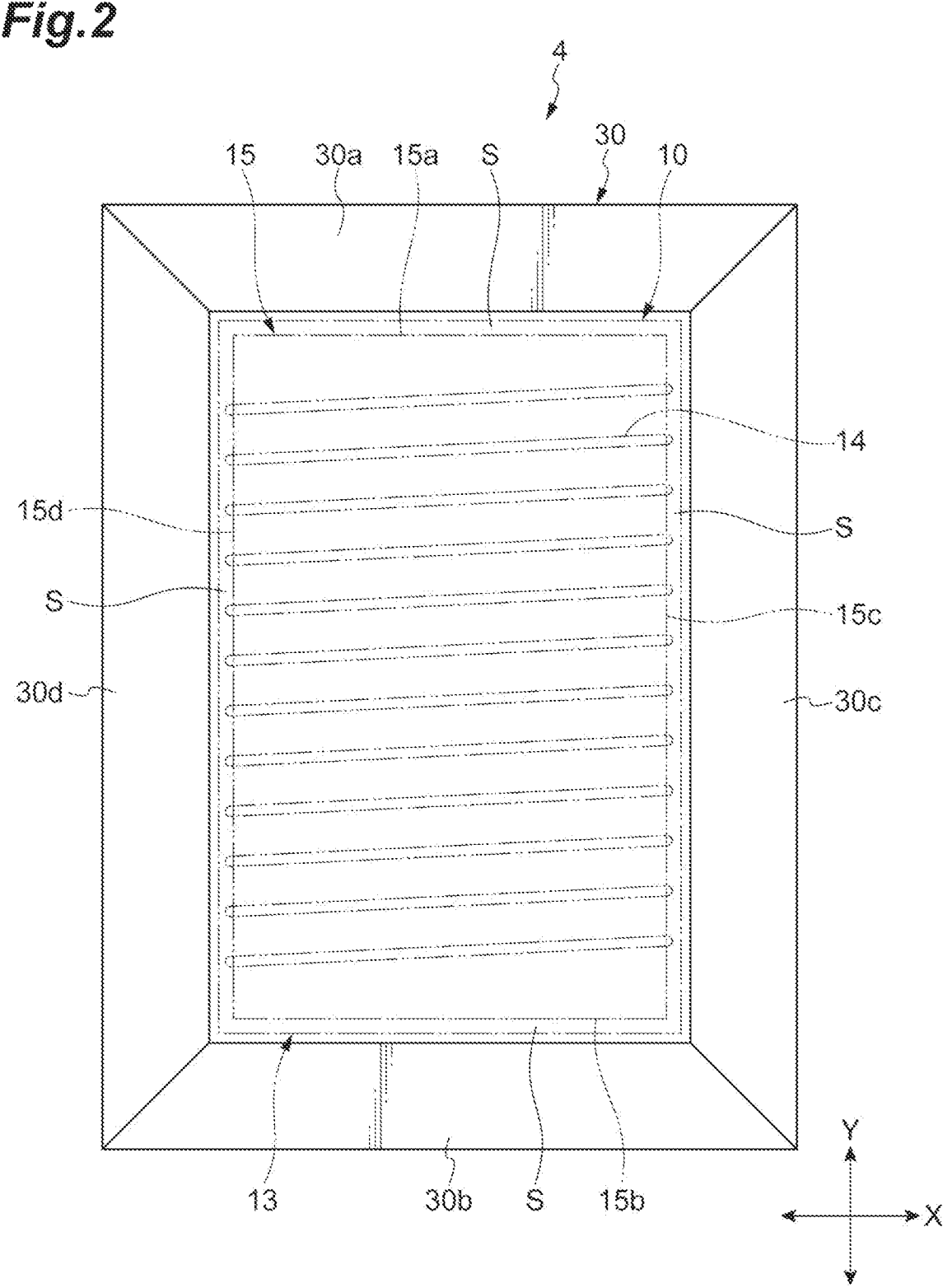
FIG. 2 is a plan view illustrating a power transmission coil device of FIG. 1.

As illustrated in FIG. 1 and FIG. 2, the auxiliary ferrite (auxiliary magnetic member, first auxiliary magnetic member) 30 for suppressing a reduction in power efficiency is provided in the power transmission coil device 4 of the wireless power transfer system 1. The auxiliary ferrite 30 is provided adjacent to the power transmission coil portion 13 in the front-rear direction Y (first direction). More specifically, four auxiliary ferrites 30a to 30d extend along the power transmission coil portion 13 to surround the power transmission coil portion 13. The front auxiliary ferrite 30a is provided adjacent to the front end portion 15a of the power transmission coil portion 13. The rear auxiliary ferrite 30b is provided adjacent to the rear end portion 15b of the power transmission coil portion 13. The right auxiliary ferrite 30c is provided adjacent to a right end portion 15c of the power transmission coil portion 13. The left auxiliary ferrite 30d is provided adjacent to a left end portion 15d of the power transmission coil portion 13.

For example, the respective auxiliary ferrites 30a to 30d are fixed on a rectangular frame-shaped base portion 32. The base portion 32 is fixed to the road surface R to surround the housing 10. For example, the base portion 32 is made of a non-magnetic material such as resin. In an example illustrated in FIG. 1 and FIG. 2, the auxiliary ferrite 30 is provided outside the housing 10. However, the auxiliary ferrite 30 may be accommodated in the housing 10. In other words, the auxiliary ferrite 30 may be provided between the protective cover 12 and the power transmission coil portion 13.

A rectangular frame-shaped space S is provided between the auxiliary ferrites 30a to 30d and the end portions 15a to 15d of the ferrite plate 15. In the example illustrated in FIG. 1 and FIG. 2, the protective cover 12 is disposed in the space S. The space S may be a constant space in a whole circumference of the ferrite plate 15, or may be different between a front and rear space and a right and left space. By providing the space S as described above, the auxiliary ferrite 30 may be inhibited from functioning in a case in which the power reception coil device 5 directly faces the power transmission coil device 4 (the case illustrated in FIG. 1). The space S is a space that increases a magnetic resistance. The space S is empty (that is, air is present therein), or a non-magnetic member is provided in the space S.

Further, the respective auxiliary ferrites 30a and 30b are configured to be closer to the power reception coil device 5 with increasing distance from the power transmission coil portion 13 in the front-rear direction Y. The respective auxiliary ferrites 30c and 30d are configured to be closer to the power reception coil device 5 with increasing distance from the power transmission coil portion 13 in the left-right direction X. In other words, the front auxiliary ferrite 30a protrudes upward toward a front end thereof. The rear auxiliary ferrite 30b protrudes upward toward a rear end thereof. The right auxiliary ferrite 30c protrudes upward toward a right end thereof. The left auxiliary ferrite 30d protrudes upward toward a left end thereof.

In other words, each of the auxiliary ferrites 30a to 30d has a facing surface 31 that becomes higher outward with respect to the power transmission coil portion 13. A highest distal end of the facing surface 31 corresponds to apex portions 31a and 31b or the like (see FIG. 3).

A shape of the facing surface 31 will be described in more detail with reference to FIG. 3. When a position of the front end portion 15a of the power transmission coil portion 13 matches a position of the front end portion 25a corresponding to an end portion of the power reception coil portion 23 in the front-rear direction Y, the front end portion 25a of the power reception coil portion 23 is positioned at a point P1 illustrated in FIG. 3. The facing surface 31 of the auxiliary ferrite 30 extends along a circumference of a circle C1, a center of which is at the point P1, passing through the front end portion 15a of the power transmission coil portion 13. Herein, a radius of the circle C1 is approximately equal to a distance between a median line of the ferrite plate 15 in a thickness direction and a median line of the front end portion 25a in a thickness direction, which is a distance d1. The facing surface 31 may be an inclined plane in which a plurality of planes extending in an extending direction of the auxiliary ferrite 30 is combined, and may include a curved surface or one plane.

Figure 3:
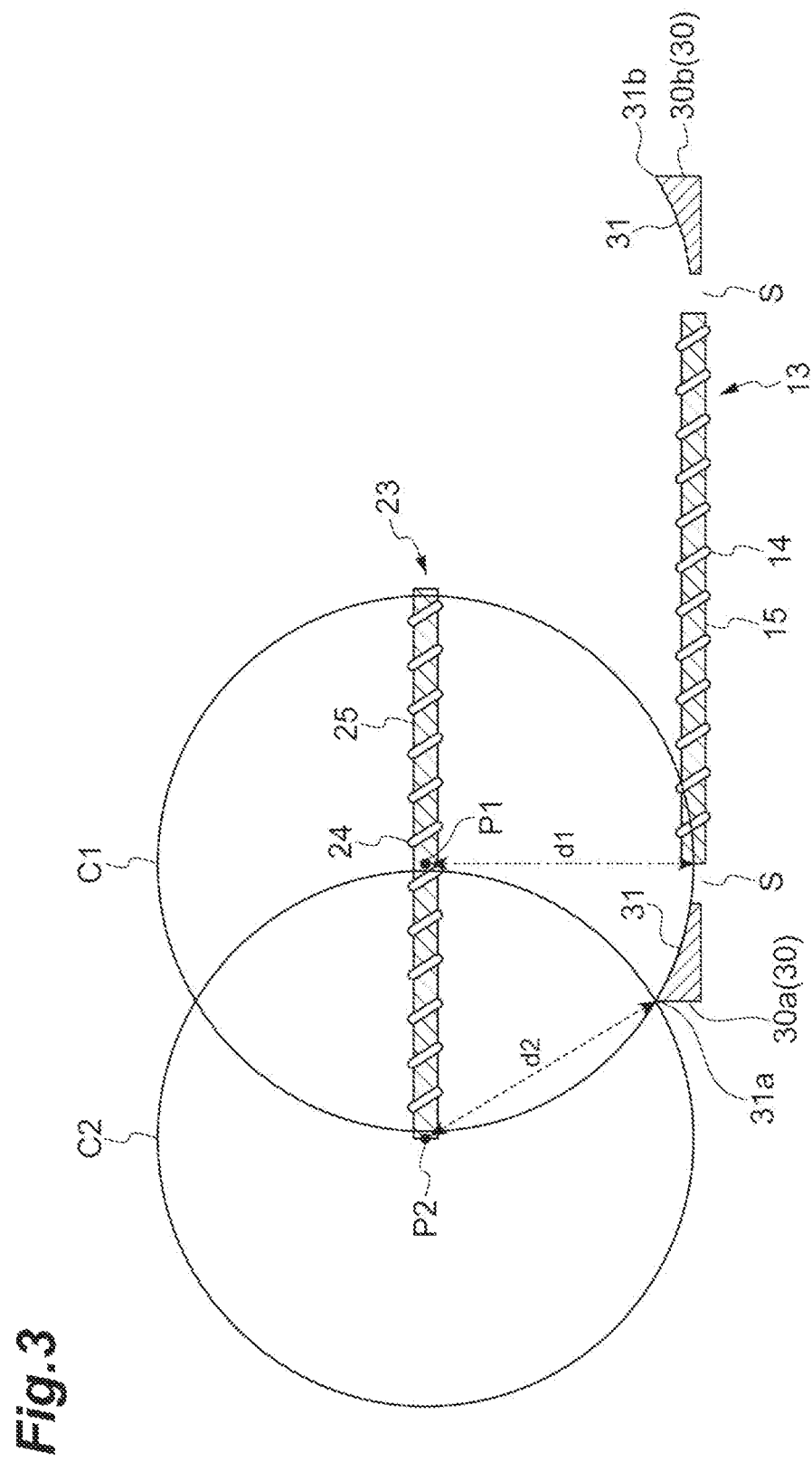
FIG. 3 is a diagram for description of a shape of a facing surface of an auxiliary magnetic member in the wireless power transfer system of FIG. 1.
Figure 4:
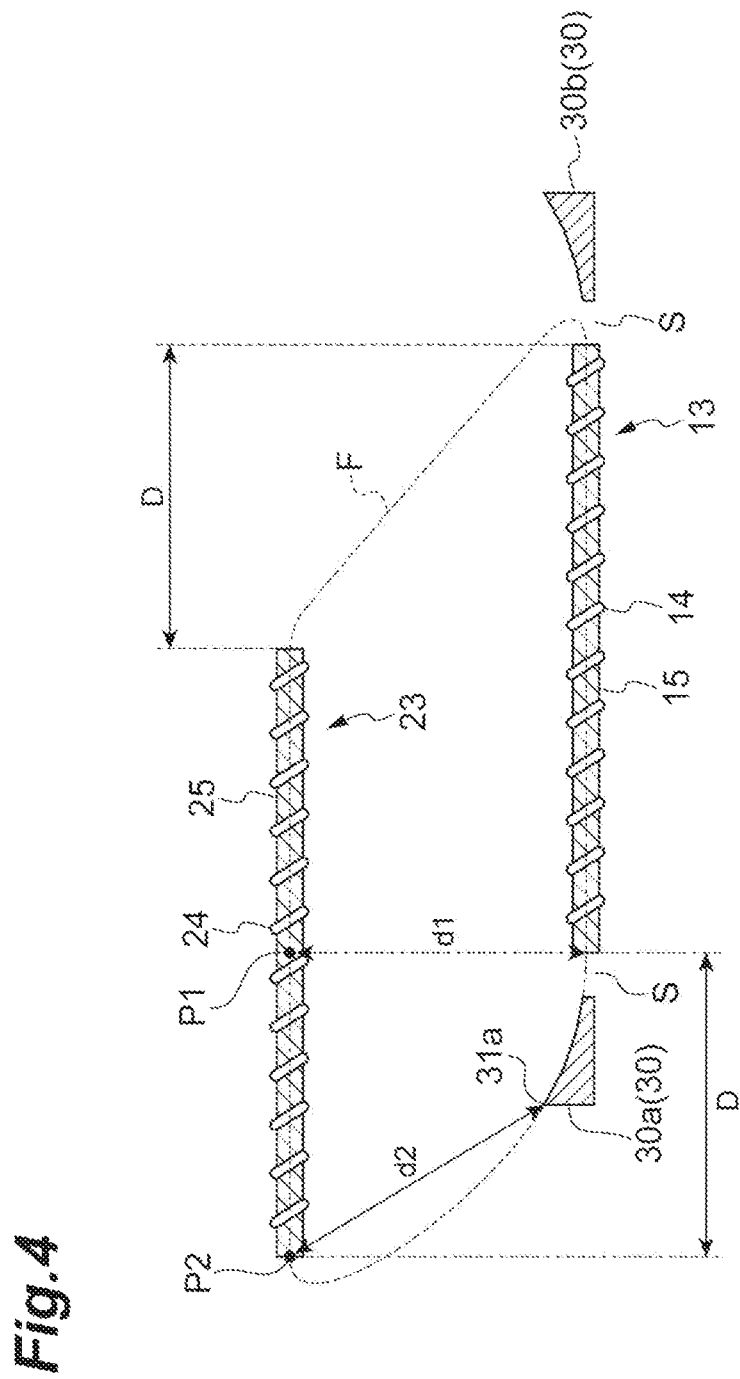
FIG. 4 is a side cross-sectional view illustrating a magnetic flux when a misalignment occurs in the wireless power transfer system of FIG. 1.

In a state illustrated in FIG. 3 and FIG. 4, the power reception coil portion 23 is misaligned from the power transmission coil portion 13 by a maximum permissible misalignment D in the front-rear direction Y. In this state in which a misalignment corresponding to the maximum permissible misalignment D occurs, the front end portion 25a of the ferrite plate 25 is separated from the apex portion 31a of the facing surface 31 of the auxiliary ferrite 30a by a distance d2 (see a circle C2 of FIG. 3). The distance d2 is equivalent to the distance d1 which is the radius of the circle C1 described above.

Herein, for example, the maximum permissible misalignment D is a maximum value among misalignment amounts set in advance to be able to satisfy predetermined power efficiency. Specifically, power efficiency is measured in advance by varying a misalignment, and a maximum misalignment amount among misalignments, at which power efficiency greater than or equal to a certain value is obtained, is the maximum permissible misalignment D. As another example, for example, the maximum permissible misalignment D may be set to a maximum value among misalignment amounts at which a reduction in power efficiency is less than or equal to 5% or 10% of maximum power efficiency. Power efficiency indicates a ratio of power at a certain place inside a power receiver including the power reception coil device 5 to power at a certain place inside a power transmitter including the power transmission coil device 4. For example, power efficiency is a ratio of power of an output of the rectifier of the power receiver to power of an input of the inverter of the power transmitter. Herein, the inverter of the power transmitter generates desired AC power, which is transmitted from the power transmission coil device 4 to the power reception coil device 5, from DC power (an output from the DC power source, power obtained by rectifying an output from the AC power source or the like). The rectifier of the power receiver converts the AC power received by the power reception coil device 5 into DC power (for example, power input to the battery).

Alternatively, the maximum permissible misalignment D may be defined as a maximum value among misalignment amounts at which the power receiver including the power reception coil device 5 may supply predetermined power (for example, 3 kW) to a load connected to the power receiver rather than among misalignment amounts set to satisfy the predetermined power efficiency.

Further, another example of the maximum permissible misalignment D is a misalignment amount descried in a specification, a usage manual or the like of the wireless power transfer system 1 in terms of a usage mode of the wireless power transfer system 1 determined in advance. Even though the maximum permissible misalignment D may vary depending on a model, an automobile rank or the like of the electric vehicle EV, examples thereof include a numerical value of 100 mm in the front-rear direction Y and 200 mm in the left-right direction X. In this case, the usage manual may state that "Please use the system such that the misalignment falls within a range of 100 mm in the front-rear direction Y and 200 mm in the left-right direction X".

No misalignment may mean a positional relation between the power transmission coil device 4 and the power reception coil device 5 in which maximum power efficiency of the present wireless power transfer system 1 is implemented. Alternatively, no misalignment may mean that a center of a surface of the power transmission coil portion 13 in the front-rear direction Y and a center of a surface of the power reception coil portion 23 in the front-rear direction Y match each other in the vertical direction Z. Alternatively, no misalignment may mean a positional relation between the power transmission coil device 4 and the power reception coil device 5 defined as no misalignment in the specification, the usage manual or the like of the wireless power transfer system 1. A shift from these reference positions indicating no misalignment is set as a misalignment.

Different numerical values may be set in the front-rear direction Y and the left-right direction X as the maximum permissible misalignment D. In a movable body such as the electric vehicle EV which runs in the front-rear direction Y, the maximum permissible misalignment D in the front-rear direction Y (winding axis direction of the power reception coil device 5) may be determined to be smaller than the maximum permissible misalignment D in the left-right direction X (wound wire direction of the power reception coil device 5).

The power transmission coil device 4 faces the power reception coil device 5 to wirelessly transmit power. The magnetic flux may be induced as desired by the auxiliary ferrite 30 provided adjacent to the power transmission coil portion 13. In more detail, as illustrated in FIG. 4, when a misalignment occurs in the front-rear direction Y between the power transmission coil device 4 and the power reception coil device 5, the power transmission coil portion 13 does not directly face the power reception coil portion 23. In this case, a distal end portion of the power reception coil portion 23 (the front end portion 25a on the left side of the figure) is closer to the auxiliary ferrite 30a than to the power transmission coil portion 13. Therefore, when a magnetic flux is not directly directed to the power reception coil portion 23 from the power transmission coil portion 13, and the magnetic flux F is directed to the power reception coil portion 23 via the auxiliary ferrite 30a, a length of the magnetic flux F passing through air may be inhibited from increasing (see the distance d2 of FIG. 4). Further, the auxiliary ferrite 30a is configured to be closer to the power reception coil device 5 with increasing distance from the power transmission coil portion 13 in the front-rear direction Y. Thus, even when the misalignment increases, the auxiliary ferrite 30a becomes closer to the power reception coil device 5 by the increase. As such, even when the misalignment is large, the length of the magnetic flux F passing through air may be inhibited from increasing. Therefore, a variation in distance between the power transmission coil portion 13 and the power reception coil portion 23 may be suppressed irrespective of the misalignment amount. As a result, a reduction in power efficiency is suppressed.

When no misalignment occurs in the front-rear direction Y between the power transmission coil device 4 and the power reception coil device 5, the ferrite plate 25 of the power reception coil portion 23 is closer to the ferrite plate 15 than to the auxiliary ferrite 30. The magnetic flux F is easily intensively directed to a path from the power transmission coil portion 13 to the power reception coil portion 23 not passing through the auxiliary ferrite 30 by providing the space S between the auxiliary ferrite 30 and the ferrite plate 15, and intentionally increasing a magnetic resistance when compared to a case in which the auxiliary ferrite 30 is integrated with the ferrite plate 15. As a result, a leakage range of the magnetic flux is suppressed, and a reduction in power efficiency is suppressed.

Since the facing surface 31 of the auxiliary ferrite 30 extends along the circumference of the circle C1, the center of which is at the point P1 of the front end portion 25a of the power reception coil portion 23 when the power transmission coil portion 13 directly faces the power reception coil portion 23, a shortest path obtained when no misalignment occurs (that is, a path corresponding to the distance d1 which is the radius of the circle) may be implemented even when a misalignment occurs in the front-rear direction Y between the power transmission coil device 4 and the power reception coil device 5. In this way, a reduction in power efficiency at the time of the misalignment is suppressed at a minimum.

The auxiliary ferrite 30 is provided adjacent to the ferrite plate 15 in the front-rear direction Y and the left-right direction X, respectively. Thus, an effect that a reduction in power efficiency is suppressed is exhibited with respect to both the misalignment in the front-rear direction Y and the misalignment in the left-right direction X.

According to the wireless power transfer system 1 and the auxiliary ferrite 30 described above, a reduction in power efficiency is suppressed even when a misalignment occurs between the power transmission coil device 4 and the power reception coil device 5.

As illustrated in FIG. 5, in a conventional wireless power transfer system 100, a magnetic flux generated in a power transmission coil device 104 passes through a long path in air when a misalignment occurs (see an arrow in a solid line indicated in FIG. 5). As a result, the number of magnetic fluxes interlinked with the power reception coil device 105 decreases, coupling between the power transmission coil portion 13 and the power reception coil portion 23 weakens, and thus power efficiency decreases. According to the wireless power transfer system 1 and the power transmission coil device 4 of the present embodiment, as many magnetic fluxes F interlinked with the power reception coil device 5 as possible may be ensured by the auxiliary ferrite 30, and a reduction in power efficiency may be suppressed even when a misalignment occurs.

A description will be given of a wireless power transfer system according to a second embodiment with reference to FIG. 6. In this wireless power transfer system, in addition to the above-described auxiliary ferrite 30, an auxiliary ferrite (another auxiliary magnetic member, second auxiliary magnetic member) 40 similar to the auxiliary ferrite 30 is provided in the power reception coil portion 23. Specifically, a front auxiliary ferrite 40a is provided adjacent to the front end portion 25a of the power reception coil portion 23, and a rear auxiliary ferrite 40b is provided adjacent to the rear end portion 25b of the power reception coil portion 23. The auxiliary ferrite 40 may be provided in the left-right direction X in addition to the front-rear direction Y. According to this wireless power transfer system, even when a misalignment occurs between the power transmission coil device 4 and the power reception coil device 5, a reduction in power efficiency may be suppressed in two types of magnetic paths (that is, a magnetic path from the apex portion 31a of the auxiliary ferrite 30a to the front end portion 25a of the ferrite plate 25 and a magnetic path from the rear end portion 15b of the ferrite plate 15 to the auxiliary ferrite 40b).

Figure 7A:
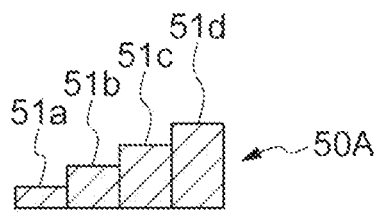
FIGS. 7A to 7F are cross-sectional views illustrating modifications of the auxiliary magnetic member, respectively.

Shapes of the auxiliary ferrites 30 and 40 are not restricted to the above-described shapes, and various modifications may be adopted. For example, as illustrated in FIG. 7A, it is possible to adopt an auxiliary ferrite 50A including a plurality of divided auxiliary ferrites 51a to 51d arranged side by side in the front-rear direction Y. The respective divided auxiliary ferrites 51a to 51d have different heights to form a step shape, and are joined to one another by adhesion or the like. In this case, since a magnetic member is divided, the magnetic flux F is easily directed to the power reception coil portion 23 from a divided magnetic member closest to the distal end portion of the power reception coil portion 23 depending on the size of the misalignment.

Figure 7B:
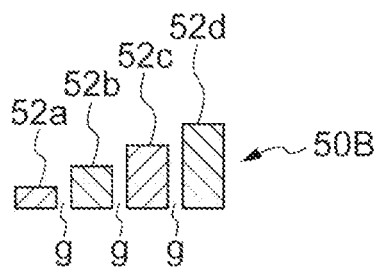

Alternatively, as illustrated in FIG. 7B, it is possible to adopt an auxiliary ferrite 50B in which a gap g is provided between a plurality of divided auxiliary ferrites 52a to 52d. The respective divided auxiliary ferrites 52a to 52d have different heights to form a step shape, and are separated from one another in the front-rear direction Y. In this case, when the gap g is provided, the magnetic flux F may be more reliably directed to the power reception coil portion 23 from a divided magnetic member closest to the distal end portion of the power reception coil portion 23.

Figure 7C:
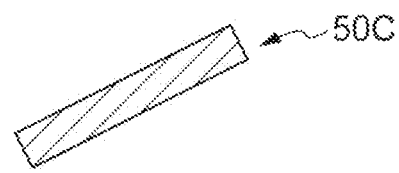
Figure 7D:
Figure 7E:
Figure 7F:

Alternatively, as illustrated in FIG. 7C, it is possible to adopt an auxiliary ferrite 50C including one inclined plate-shaped member. As illustrated in FIG. 7D, it is possible to adopt an auxiliary ferrite 50D including one plane as an inclined plane. As illustrated in FIG. 7E, it is possible to adopt an auxiliary ferrite 50E including a curved apex portion 55. As illustrated in FIG. 7F, it is possible to adopt an auxiliary ferrite 50F in which a main body portion 56a and an outer circumferential portion 56b are joined together. In other words, while an inclined shape such as the main body portion 56a is necessary within a range of the maximum permissible misalignment D, any shape may be adopted out of the range of the maximum permissible misalignment D.

As described above, it should be noted that a configuration in which the auxiliary ferrite 30 (the auxiliary ferrite 40) becomes closer to the power reception coil device 5 (the power transmission coil device 4) with increasing distance from the power transmission coil portion 13 (the power reception coil portion 23) in the front-rear direction Y or the left-right direction X includes a configuration in which the auxiliary ferrite continuously becomes closer to the coil device and a configuration in which the auxiliary ferrite becomes closer to the coil device stepwise.

Figure 8:
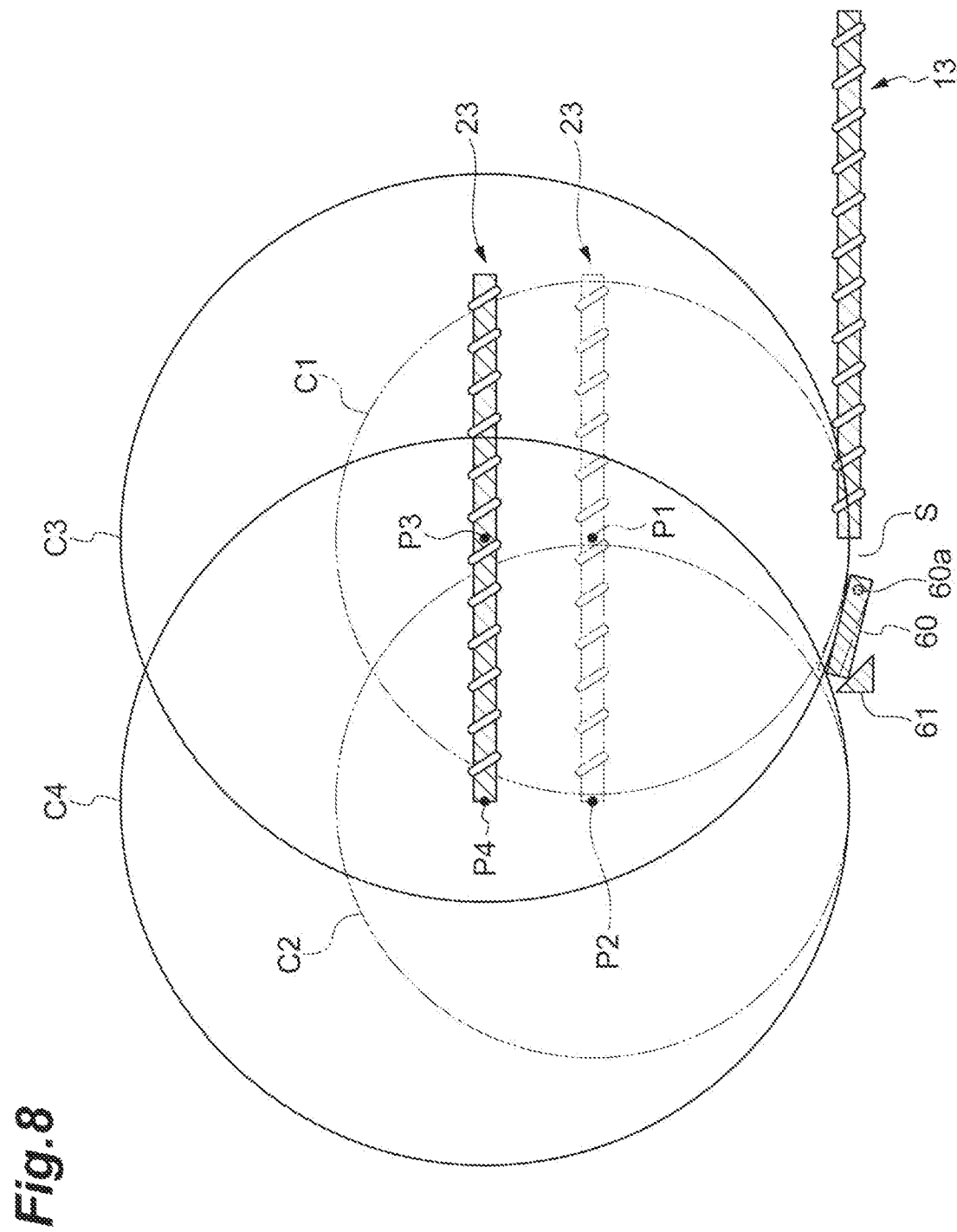
FIG. 8 is a side cross-sectional view schematically illustrating a main part of a wireless power transfer system according to a third embodiment of the disclosure.

A description will be given of a wireless power transfer system according to a third embodiment with reference to FIG. 8. In this wireless power transfer system, an auxiliary ferrite (auxiliary magnetic member, first auxiliary magnetic member) 60 is configured such that a slope of a facing surface thereof facing the power reception coil device 5 is adjustable. More specifically, the auxiliary ferrite 60 includes a rotation fulcrum 60a on the power transmission coil portion 13 side, and is rotatable about the rotation fulcrum 60a. An angle of the auxiliary ferrite 60 is defined by a wedge-shaped angle holding member 61. In this case, the slope of the facing surface of the auxiliary ferrite 60 may be adjusted as to a variation of a gap between the power transmission coil portion 13 and the power reception coil portion 23 (see a circle C3 whose center is at a point P3 and a circle C4 whose center is at a point P4 indicated by solid lines). Therefore, an effect that a reduction in power efficiency is suppressed is exhibited with respect to a position variation in the vertical direction Z.

Figure 9:
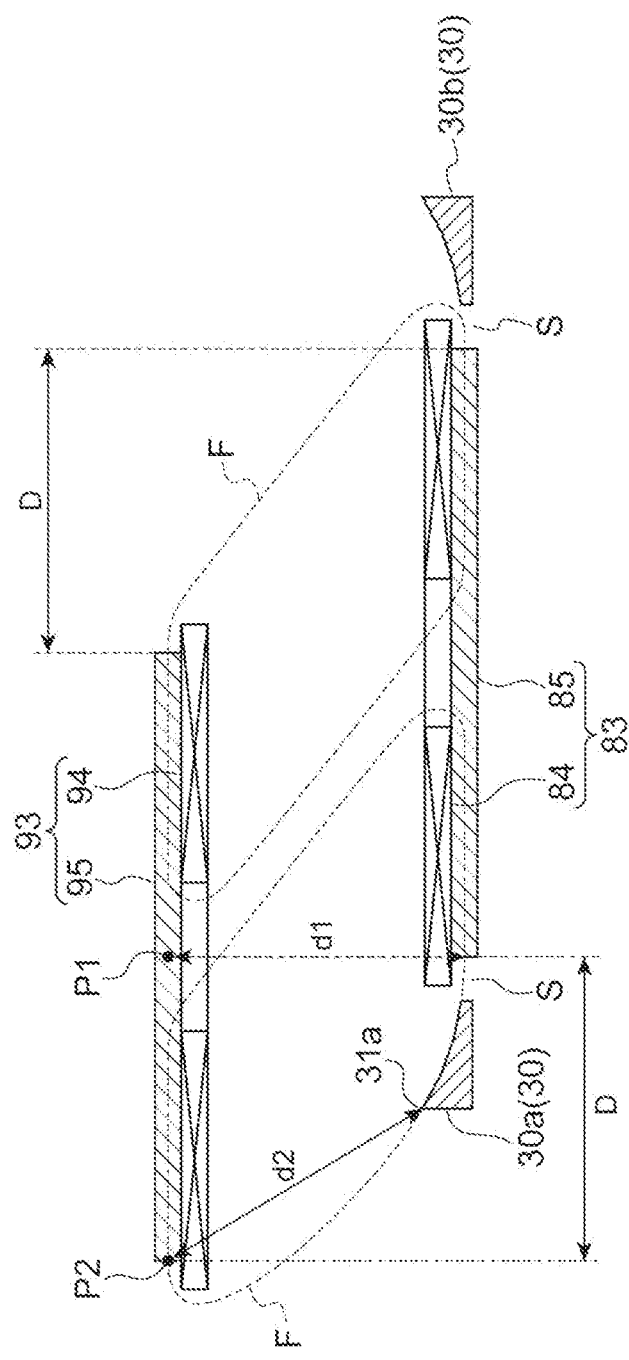
FIG. 9 is a side cross-sectional view schematically illustrating a main part of a wireless power transfer system according to a fourth embodiment of the disclosure.

A description will be given of a wireless power transfer system according to a fourth embodiment with reference to FIG. 9. This wireless power transfer system is different from the wireless power transfer system 1 of the first embodiment in that a power transmission coil device and a power reception coil device which employ a power transmission coil portion 83 and a power reception coil portion 93 of a circular type are included instead of the power transmission coil device 4 and the power reception coil device 5 which employ the power transmission coil portion 13 and the power reception coil portion 23 of a solenoid type. The power transmission coil device includes a ferrite plate 85 and a rectangular spiral-shaped conductive wire 84 fixed on the ferrite plate 85. The ferrite plate 85 is disposed on a rear surface side of the conductive wire 84. A ferrite plate 95 and a rectangular spiral-shaped conductive wire 94 fixed on the ferrite plate 95 are accommodated in the power reception coil device. The ferrite plate 95 is disposed on a rear surface side of the conductive wire 94. A shape and a size of the power transmission coil portion 83 are equivalent to a shape and a size of the power reception coil portion 93. In such a wireless power transfer system, the magnetic flux F may be induced by the auxiliary ferrite 30, and a reduction in power efficiency is suppressed.

Hereinbefore, the embodiments of the disclosure have been described. However, the invention is not restricted to the above embodiments. For example, in a case in which the power reception coil portion of the solenoid type is adopted, the winding axis direction and the wound wire direction may be reversed from those in the above embodiments. In other words, a direction in which the power reception coil device 5 is attached may be misaligned by 90 degrees (or another arbitrary angle) with respect to an axial line of the vertical direction Z. In a case in which the power transmission coil portion and the power reception coil portion of the circular type are adopted, a shape in which the conductive wire 54 is wound is not restricted to a rectangular shape, and may be a circular shape. In a case in which the power transmission coil portion and the power reception coil portion of the circular type are adopted, the ferrite plate may be omitted.

In the above embodiments, a description has been given of a case in which the magnetic member is the ferrite plates 15, 25, 85, and 95. However, the magnetic member is not restricted to the ferrite plates 15, 25, 85, and 95. The magnetic member may be implemented by another magnetic material (for example, a silicon steel plate, an amorphous magnetic alloy, or a magnet). The magnetic member is preferably a soft magnetic material (for example, a ferrite, a silicon steel plate, or an amorphous magnetic alloy) in terms of improvement in power efficiency.

The above embodiments have shown an example in which the litz wire is used as the conductive wires 14, 24, 84, and 94. However, the invention is not restricted thereto, and a conductive wire other than the litz wire may be used as long as the conductive wire functions as a coil device for wireless power transfer. For example, it is possible to arbitrarily select a type, a mode, a form, a material, a configuration, a shape, and a size of the conductive wires 14, 24, 84, and 94.

The space may not be provided between the first auxiliary magnetic member (or the second auxiliary magnetic member) and the first coil portion (or the second coil portion). In other words, the first auxiliary magnetic member (or the second auxiliary magnetic member) may come into contact with the first coil portion (or the second coil portion), or the first auxiliary magnetic member (or the second auxiliary magnetic member) may be connected to or integrated with the first coil portion (or the second coil portion) while another member is interposed therebetween.

The invention is not restricted to the vehicle body of the vehicle running on a ground, and is applicable to another movable body such as an underwater sailing body. In other words, the invention is applicable to all types of movable bodies in which a misalignment may occur between a power transmission coil device and a power reception coil device.

INDUSTRIAL APPLICABILITY

Some aspects of the disclosure make it possible to suppress a reduction in power efficiency even when a misalignment occurs between a pair of coil devices.

The invention claimed is:

1. A first coil device that wirelessly transmits power to or receives power from a second facing coil device upon alignment of the first and second coil devices within an acceptable alignment range, the first coil device comprising:
   a first coil portion; and
   a first auxiliary magnetic member provided adjacent to the first coil portion in a first direction orthogonal to a facing direction, wherein the first auxiliary magnetic member has a facing surface configured to face the second coil device in the facing direction defined between a proximal edge closest to the first coil portion and a distal edge furthest from first coil portion with a distance to the second coil device increasing from the distal edge of the first auxiliary magnetic member to the proximal edge of the first auxiliary magnetic member,
   wherein the distal edge projects above the first coil portion in the facing direction whereby flux leakage of power exchange is suppressed due to a shorter distance of the distal edge to the second coil device upon the condition that the first and second coil devices are disposed at a limit of the acceptable alignment range in the first direction, and
   the first auxiliary magnetic member includes a plurality of magnetic elements of differing heights arranged side by side in the first direction in a stepped arrangement from shortest to tallest such that a shortest magnetic element is disposed closest to the first coil portion to define the proximal edge and a tallest magnetic element is disposed furthest from the first coil portion to define the distal edge.

2. The first coil device according to claim 1, wherein a space is provided between the first auxiliary magnetic member and the first coil portion.

3. The first coil device according to claim 1, wherein the first auxiliary magnetic member includes a plurality of divided magnetic members arranged side by side in the first direction.

4. The first coil device according to claim 3, wherein a gap is provided between the plurality of divided magnetic members.

5. The first coil device according to claim 1, wherein the facing surface extends along a circumference of a circle, a center of which is at an end portion of a second coil portion, passing through an end portion of the first coil portion when a position of the end portion of the first coil portion is matched with a position of the end portion of the second coil portion in the first direction.

6. The first coil device according to claim 1, wherein the first auxiliary magnetic member is provided adjacent to the first coil portion in a second direction orthogonal to each of the facing direction and the first direction.

7. The first coil device according to claim 1, wherein a slope of the facing surface is adjustable.

8. A wireless power transfer system comprising:
   the first coil device according to claim 1; and
   the second coil device that faces the first coil device to wirelessly transmits or receives power to and from the first coil device,
   wherein the second coil device includes
   a second coil portion, and
   a second auxiliary magnetic member provided adjacent to the second coil portion in the first direction, and
   the second auxiliary magnetic member is configured to be closer to the first coil device with increasing distance in the first direction from the second coil portion.

9. The first coil device according to claim 1, wherein the first coil portion includes a ferrite plate.

10. The first coil device according to claim 9, wherein a space is provided between the first auxiliary magnetic member and an end portion of the ferrite plate in the first direction, and
    wherein the proximal edge of the first auxiliary magnetic member is disposed such that the space is provided in the first direction with respect to the end portion of the ferrite plate.

11. The first coil device according to claim 1, wherein the plurality of magnetic elements are joined to each other without gaps therebetween.

12. The first coil device according to claim 1, wherein the plurality of magnetic elements are selectively spaced from each other with gaps therebetween.

13. An auxiliary magnetic member provided, among a first coil device and a second coil device, at least in the first coil device for performing wireless power transfer, the auxiliary magnet member comprising:
    a facing surface that is separated from the second coil device by a distance in a facing direction in which the first coil device faces the second coil device; and a first surface that is adjacent to a coil portion of the first coil device in a first direction orthogonal to the facing direction;
    wherein the facing surface is configured to be closer to the second coil device in the facing direction with a distance to the second coil device increasing from a distal end to the coil portion, and
    wherein the distal end is located above the first coil portion in the facing direction, and
    the auxiliary magnetic member includes a plurality of magnetic elements of differing heights arranged side by side in the first direction in a stepped arrangement from shortest to tallest such that a shortest magnetic element is disposed closest to the first coil portion to define the proximal edge and a tallest magnetic element is disposed furthest from the first coil portion to define the distal edge.

14. A first coil device that wirelessly transmits power to or receives power from a second facing coil device upon alignment of the first and second coil devices within an acceptable alignment range, the first coil device comprising:
    a first coil portion; and
    a first auxiliary magnetic member provided adjacent to the first coil portion in a first direction orthogonal to a facing direction, wherein the first auxiliary magnetic member includes a plurality of magnetic elements of differing heights arranged side by side in the first direction from shortest to tallest, wherein the first auxiliary magnetic member has a facing surface configured to face the second coil device in the facing direction defined from a shortest magnetic element disposed closest to the first coil portion and a tallest magnetic element disposed furthest from the first coil portion with a distance to the second coil device increasing from the tallest magnetic element of the first auxiliary magnetic member to the first coil portion whereby flux leakage of power exchange is suppressed due to a shorter distance of the tallest magnetic element to the second coil device upon the condition that the first and second coil devices are disposed at a limit of the acceptable alignment range in the first direction.

15. The first coil device according to claim 14, wherein the plurality of magnetic elements are joined to each other without gaps therebetween.

16. The first coil device according to claim 14, wherein the plurality of magnetic elements are selectively spaced from each other with gaps therebetween.

17. A first coil device that wirelessly transmits power to or receives power from a second facing coil device upon alignment of the first and second coil devices within an acceptable alignment range, the first coil device comprising:
a first coil portion; and
a first auxiliary magnetic member provided adjacent to the first coil portion in a first direction orthogonal to a facing direction, wherein the first auxiliary magnetic member has a facing surface configured to face the second coil device in the facing direction defined between a proximal edge closest to the first coil portion and a distal edge furthest from first coil portion with a distance to the second coil device increasing from the distal edge of the first auxiliary magnetic member to the first coil portion whereby flux leakage of power exchange is suppressed due to a shorter distance of the distal edge to the second coil device upon the condition that the first and second coil devices are disposed at a limit of the acceptable alignment range in the first direction, wherein the facing surface extends along a circumference of a circle, a center of which is at an end portion of a second coil portion, passing through an end portion of the first coil portion when a position of the end portion of the first coil portion is matched with a position of the end portion of the second coil portion in the first direction, and the first auxiliary magnetic member includes a plurality of magnetic elements of differing heights arranged side by side in the first direction in a stepped arrangement from shortest to tallest such that a shortest magnetic element is disposed closest to the first coil portion to define the proximal edge and a tallest magnetic element is disposed furthest from the first coil portion to define the distal edge.

18. The first coil device according to claim 17, wherein the plurality of magnetic elements are joined to each other without gaps therebetween.

19. The first coil device according to claim 17, wherein the plurality of magnetic elements are selectively spaced from each other with gaps therebetween.

* * * * *